(12) United States Patent
Chen

(10) Patent No.: US 9,635,912 B1
(45) Date of Patent: May 2, 2017

(54) SMART GEMSTONE AND A PREPARATION METHOD THEREOF

(71) Applicant: Guangzhou kiss kiss technology co., LTD, Guangzhou (CN)

(72) Inventor: Songjun Chen, Guangzhou (CN)

( * ) Notice: Subject to any disclaimer, the term of this patent is extended or adjusted under 35 U.S.C. 154(b) by 0 days.

(21) Appl. No.: 15/285,495

(22) Filed: Oct. 5, 2016

(30) Foreign Application Priority Data

Mar. 17, 2016 (CN) .......................... 2016 1 0153252
Mar. 17, 2016 (CN) .......................... 2016 1 0153280

(51) Int. Cl.
*A44C 15/00* (2006.01)
*H02J 7/02* (2016.01)
*H02J 7/00* (2006.01)
*G08B 5/36* (2006.01)
*A44C 17/00* (2006.01)
*B28D 5/00* (2006.01)

(52) U.S. Cl.
CPC ........ *A44C 15/0015* (2013.01); *A44C 17/006* (2013.01); *B28D 5/0064* (2013.01); *G08B 5/36* (2013.01); *H02J 7/007* (2013.01); *H02J 7/0063* (2013.01); *H02J 7/025* (2013.01); H02J 2007/0067 (2013.01); H02J 2007/0095 (2013.01)

(58) Field of Classification Search
CPC .... A44C 15/0015; A44C 17/006; H02J 7/025; H02J 7/007; H02J 7/063; H02J 2007/0095; H02J 2007/0067; B28D 5/0064; G08B 5/36
See application file for complete search history.

(56) References Cited

U.S. PATENT DOCUMENTS 6,833,539 B1 * 12/2004 Maeda ............... A44C 15/0015
250/214 AL
2015/0009654 A1 * 1/2015 Chan .................... H05B 33/086
362/104
2016/0104355 A1 * 4/2016 Alexander ........... G08B 25/009
340/692

FOREIGN PATENT DOCUMENTS

CA 2899605 A1 * 8/2014 .......... H04M 1/7253

* cited by examiner

*Primary Examiner* — David V Bruce
(74) *Attorney, Agent, or Firm* — Prakash Nama; Global IP Services, PLLC

(57) ABSTRACT

A smart gemstone and a preparation method thereof, according to which the smart gemstone is divided into a base made of gemstone materials and a gemstone itself; the base has a cavity for accommodating a smart control unit and a wireless recharging battery. The gemstone itself is positioned on top of the base and seals the cavity. The structure of the smart gemstone is simple and compact and also high integrated. The smart gemstone has a wide scope of applications. The smart gemstone can emit lights, perform wireless power charging, provide incoming call alerts and allow associated settings. Also, it is water-resistant even in deep water.

10 Claims, 2 Drawing Sheets

SMART GEMSTONE AND A PREPARATION METHOD THEREOF

A smart gemstone and a preparation method thereof

BACKGROUND OF THE INVENTION

The present invention relates to a smart gemstone and a preparation method thereof.

Gemstones are stone materials or minerals which have met the requirements for making jewelries after cutting and polishing. As the standard of living improves, more and more people wear gemstones. At present, gemstones according to existing prior arts serve only the purpose of embellishment. A processing method of gemstones according to which the gemstones are hollowed inside for insertion of smart hardware is not provided. Also, existing prior arts do not integrate the gemstones with mobile devices.

BRIEF SUMMARY OF THE INVENTION

The primary object of the present invention is to provide a smart gemstone and a preparation method thereof. To attain the above object, the following technical solution is provided.

A smart gemstone, comprising a base and a gemstone; a cavity is formed inside the base; a smart control unit and a wireless recharging battery are accommodated inside the cavity; the wireless recharging battery is electrically connected with the smart control unit; the wireless recharging battery supplies power to the smart control unit; the gemstone is mounted on top of the base and seals the cavity; the smart control unit comprises:

a power management module; the wireless recharging battery is electrically connected with the smart control unit via the power management module to achieve charging and power supply functions of the wireless recharging battery;

a sensor module; comprising several sensor elements for detecting physical signals of the surroundings and generating analogue signals, including but not limited to acceleration sensor, photoelectric sensor, infrared sensor and gyro sensor;

a processing module; the processing module receives the analogue signals transmitted from the sensor module and generates control signals;

an alert module; the alert module receives the control signals transmitted from the processing module, and gives alerts or makes broadcast according to the received control signals;

a wireless module; the wireless module achieves wireless connection between the processing module and a smart mobile terminal to further transmit a position information to the smart mobile terminal and to transmit control commands of the smart mobile terminal to the processing module.

Preferably, the control signals are lighting control signals, vibration control signals and/or sound control signals.

The alert module comprises a lighting module, a vibration module and/or a sound module.

The lighting module receives the lighting control signals transmitted from the processing module and emits lights according to the received lighting control signals.

The vibration module receives the vibration control signals transmitted from the processing module and vibrates according to the received vibration control signals.

The sound module receives the sound control signals transmitted from the processing module and emits sounds according to the received sound control signals.

Preferably, the smart control unit also comprises a positioning module to achieve positioning of a current location, and to transmit the position information to the processing module.

Preferably, the base comprises a lower shell and an upper cover; the lower shell and the upper cover are mutually connected to form a sealed cavity; an opening is formed on the upper cover; the gemstone seals the opening.

Preferably, the opening on the upper cover is provided with non-transparent film or polycarbonate (PC) sheet to prevent the smart control unit and the wireless recharging battery inside the cavity from being seen through the gemstone.

A preparation method of a smart gemstone, comprising the following steps:

Step 1: prepare a base according to the following steps:

Step A: design the base: use a 3D software to create a 3D model of the base according to dimensions of a smart control unit and a wireless recharging battery;

Step B: choose materials: choose gemstone raw materials;

Step C: process the gemstone raw materials: use a cutting machine to cut out a rough blank of the base in a shape and dimension roughly in accordance with design requirements; the rough blank has a dimension larger than an intended exact dimension according to the design requirements to reserve extra materials required to be processed away in the next processing step;

Step D: shape the base: use a forming machine to obtain a semi-finished product of the base by forming the rough blank in a shape and a dimension substantially equal to the design requirements of the base; the semi-finished product has a dimension larger than the intended exact dimension according to the design requirements to reserve extra material required to be processed away during abrasive processing;

Step E: pre-heat the semi-finished product and adhere the semi-finished product to an adhesive rod by glue to prepare for abrasive processing;

Step F: form facets and curved surfaces on the semi-finished product according to the design requirements after rough abrasive processing, moderate abrasive processing and fine abrasive processing of the semi-finished product by using an abrasive disc of a gemstone abrading and polishing machine; thereby obtaining an unpolished final product;

Step G: apply polishing materials suitable for the materials of the base being chosen on a polishing disc of the gemstone abrading and polishing machine, and polish the unpolished final product to obtain a final product;

Step H: export a file of the 3D model of the base created by the 3D software, and then import the file to an automatic carving machine to carve the final product to obtain an internally hollowed base;

Step 2: pack the smart control unit and the wireless recharging battery inside the internally hollowed base obtained in Step 1, and then adhere a gemstone on the base.

Preferably, in Step C, use the cutting machine to cut out sheet materials for forming a lower shell and an upper cover in accordance with design requirements, thereby obtaining a lower shell rough blank and an upper cover rough blank; the lower shell rough blank and the upper cover rough blank have larger dimensions compared with the intended exact dimension according to the design requirements to reserve extra materials required to be processed away in the next processing step.

Preferably, Step C also comprises using a carving machine to internally hollow out the lower shell rough blank and the upper cover rough blank to form cavities according to setting dimensions, and using also the carving machine to cut out an opening 11 in a middle part of the upper cover rough blank according to setting dimensions.

Preferably, the step of packing the smart control unit and the wireless recharging battery comprises:

packing a wireless module and a sensor module of the smart control unit inside the upper cover to ensure sensitivity of the wireless module and the sensor module; packing a processing module and an alert module of the smart control unit and also the wireless recharging battery inside the lower shell to ensure stability of the processing module, the alert module and the wireless recharging battery; and then applying glue evenly on connecting portions of the lower shell and the upper cover to adhere the lower shell and the upper cover;

applying glue evenly on connecting portions of the upper cover and the gemstone to adhere the upper cover 1 and the gemstone.

Preferably, in Step C, the rough blank has the dimension 1-3 mm larger than the intended exact dimension according to the design requirements.

Preferably, in Step D, the semi-finished product has the dimension 0.5-1.0 mm larger than the intended exact dimension according to the design requirements.

According to the preparation method of a smart gemstone according to the present invention, the smart gemstone is divided into a base made of gemstone materials and a gemstone itself; the base is internally hollowed out for packing of a smart control unit. The structure of the smart gemstone is simple and compact and also high integrated. It is a smart gemstone with wide scope of applications; the smart gemstone can emit lights, perform wireless power charging, provide incoming call alerts and allow associated settings. Also, it is water-resistant even in deep water.

BRIEF DESCRIPTION OF THE DRAWINGS

The figures described herein are intended for further understanding of the present invention and form part of the present application. However, the figures should not constitute improper limitation to the present invention.

DETAILED DESCRIPTION OF THE INVENTION

The present invention will be further described in detail below with reference to the figures and an embodiment. The illustrative embodiment and the description herein are intended to explain the present invention, and should not be considered limiting to the present invention.

Embodiment

Figure 1:
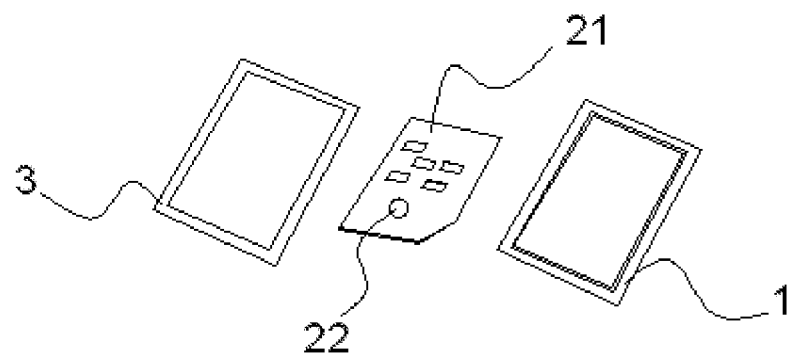
FIG. 1 is a schematic structural view showing an assembly of a base according to an embodiment of the present invention.
Figure 2:
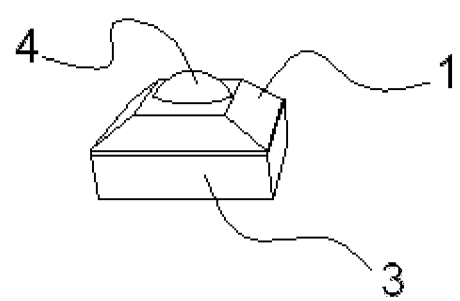
FIG. 2 is a perspective structural view of the present invention according to an embodiment of the present invention.
Figure 3:
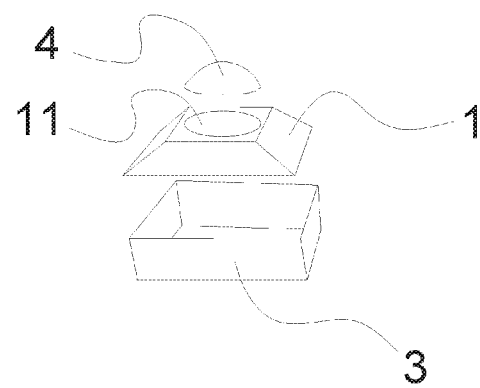
FIG. 3 is a schematic view showing a to-be-assembled condition of the present invention according to an embodiment of the present invention.
Figure 4:
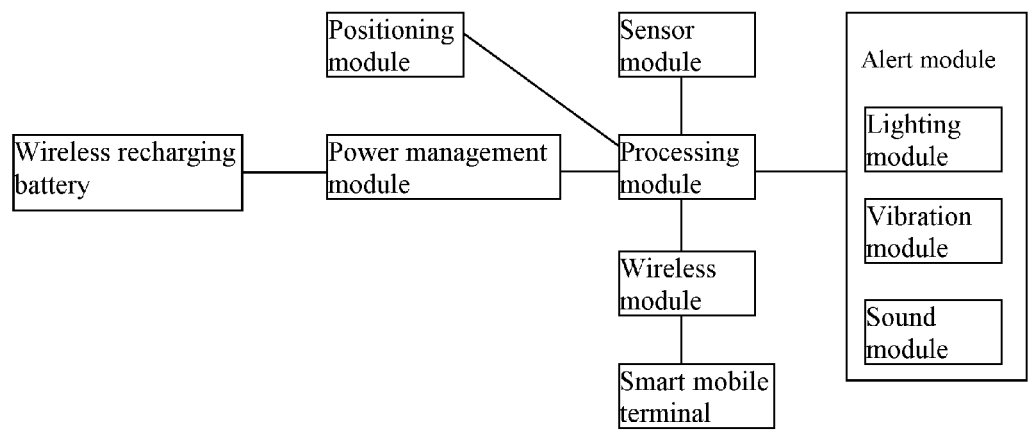
FIG. 4 is a block diagram showing a smart control unit according to an embodiment of the present invention.

As shown in FIGS. 1-4, a smart gemstone comprises a base and a gemstone 4. A cavity is formed inside the base. A smart control unit 21 and a wireless recharging battery 22 are accommodated inside the cavity. The wireless recharging battery 22 is electrically connected with the smart control unit 21. The wireless recharging battery 22 supplies power to the smart control unit 21. The gemstone 4 is mounted on top of the base and seals the cavity. The smart control unit 21 comprises:

A power management module; the wireless recharging battery 22 is electrically connected with the smart control unit 21 via the power management module to achieve charging and power supply functions of the wireless recharging battery 22.

A sensor module; comprising several sensor elements for detecting physical signals of the surroundings and generating analogue signals such as acceleration speed.

Processing module; the processing module receives the analogue signals transmitted by the sensor module and generates control signals.

Alert module; the alert module receives the control signals transmitted by the processing module, and gives alerts or makes broadcast according to the received control signals.

Wireless module; the wireless module achieves wireless connection between the processing module and a smart mobile terminal to further transmit a position information to the smart mobile terminal and to transmit control commands of the smart mobile terminal to the processing module.

In the present embodiment, the control signals are lighting control signals, vibration control signals and/or sound control signals. The alert module comprises a lighting module, a vibration module and/or a sound module. The lighting module receives the lighting control signals transmitted from the processing module and emits lights according to the received lighting control signals. The vibration module receives the vibration control signals transmitted from the processing module and vibrates according to the received vibration control signals. The sound module receives the sound control signals transmitted from the processing module and emits sounds according to the received sound control signals.

In the present embodiment, the smart control unit 21 also comprises a positioning module to achieve positioning of a current location, and to transmit the position information to the processing module.

In the present embodiment, the base comprises a lower shell 3 and an upper cover 1. The lower shell 3 and the upper cover 1 are mutually connected to form a sealed cavity. An opening 11 is formed on the upper cover 1. The gemstone 4 seals the opening 11.

In the present embodiment, the opening 11 on the upper cover 1 is provided with non-transparent film or polycarbonate (PC) sheet, so that lights emitted from the base can illuminate on the gemstone 4 through the non-transparent film or PC sheet to achieve better visual effect of the gemstone 4 and to prevent the smart control unit and the wireless recharging battery 22 inside the cavity from being seen through the gemstone 4. When the base does not emit lights, external light rays can still be refracted by the non-transparent film or PC sheet onto the gemstone 4, so that the gemstone 4 is still visually attractive even when the base does not emit lights.

In the present invention, the base is made by gemstone materials.

A preparation method of a smart gemstone, comprising the following steps:

Step 1: prepare a base according to the following steps:

Step A: design the base; use a 3D software to create a 3D model of the base according to dimensions of a smart control unit 21 and a wireless recharging battery 22;

Step B: choose materials; choose gemstone raw materials;

Step C: process the gemstone raw materials; use a cutting machine to cut out a rough blank of the base in a shape and dimension roughly in accordance with design requirements; the rough blank has a dimension 1-3 mm larger than an intended exact dimension according to the design requirements to reserve extra materials required to be processed away in the next processing step;

Step D: shape the base; use a forming machine to obtain a semi-finished product of the base by forming the rough blank in a shape and a dimension substantially equal to the design requirements of the base; the semi-finished product has a dimension 0.5-1 mm larger than the intended exact dimension according to the design requirements to reserve extra material required to be processed away during abrasive processing;

Step E: pre-heat the semi-finished product and adhere the semi-finished product to an adhesive rod by glue to prepare for abrasive processing;

Step F: form facets and curved surfaces on the semi-finished product according to the design requirements after rough abrasive processing, moderate abrasive processing and fine abrasive processing of the semi-finished product by using an abrasive disc of a gemstone abrading and polishing machine; thereby obtaining an unpolished final product;

Step G: apply polishing materials suitable for the materials of the base being chosen on a polishing disc of the gemstone abrading and polishing machine, and polish the unpolished final product to obtain a final product;

Step H: export a file of the 3D model of the base created by the 3D software, and then import the file to an automatic carving machine to carve the final product to obtain an internally hollowed base;

Step 2: pack the smart control unit 21 and the wireless recharging battery 22 inside the internally hollowed base obtained in Step 1, and then adhere a gemstone on the base.

Preferably, in Step C, use the cutting machine to cut out sheet materials for forming a lower shell 3 and an upper cover 1 roughly in accordance with design requirements, thereby obtaining a lower shell rough blank and an upper cover rough blank; the lower shell rough blank and the upper cover rough blank have larger dimensions compared with the intended exact dimension according to the design requirements to reserve extra materials required to be processed away in the next processing step.

In the present embodiment, the base comprises the lower shell 3 and the upper cover 1. Therefore, Step C also comprises using a carving machine to internally hollow out the lower shell rough blank and the upper cover rough blank to form cavities according to setting dimensions, and using also the carving machine to cut out an opening 11 in a middle part of the upper cover rough blank according to setting dimensions.

In the present embodiment, the step of packing the smart control unit 21 and the wireless recharging battery 22 comprises:

Packing a wireless module and a sensor module of the smart control unit 21 inside the upper cover 1 to ensure sensitivity of the wireless module and the sensor module; packing a processing module and an alert module of the smart control unit and also the wireless recharging battery 22 inside the lower shell 3 to ensure stability of the processing module, the alert module and the wireless recharging battery 22; and then applying glue evenly on connecting portions of the lower shell 3 and the upper cover 1 to adhere the lower shell 3 and the upper cover; also, applying glue evenly on connecting portions of the upper cover 1 and the gemstone to adhere the upper cover 1 and the gemstone.

In the present embodiment, the glue is AB glue or UV glue.

The technical solution according to an embodiment of the present invention is described in detail above. Examples are given above to explain the principle of the embodiment of the present invention and the ways of implementing the present invention. The above description is only intended as an aid to understand the principle of the embodiment of the present invention. A person skilled in this field of art may alter the embodiment and the field where the present invention may be applied in accordance with the teachings of the present invention. Therefore, the above description should not be considered limiting to the present invention.

What is claimed is:

1. A smart gemstone, comprising:
a base and a gemstone; a cavity is formed inside the base; a smart control unit and a wireless recharging battery are accommodated inside the cavity; the wireless recharging battery is electrically connected with the smart control unit; the wireless recharging battery supplies power to the smart control unit; the gemstone is mounted on top of the base and seals the cavity; the smart control unit comprises:
a power management module; the wireless recharging battery is electrically connected with the smart control unit via the power management module to achieve charging and power supply functions of the wireless recharging battery;
a sensor module; comprising several sensor elements for detecting physical signals of surroundings and generating analogue signals;
a processing module; the processing module receives the analogue signals transmitted from the sensor module and generates control signals;
an alert module; the alert module receives the control signals transmitted from the processing module, and gives alerts or makes broadcast according to the received control signals;
a wireless module; the wireless module achieves wireless connection between the processing module and a smart mobile terminal to further transmit a position information to the smart mobile terminal and to transmit control commands of the smart mobile terminal to the processing module.

2. The smart gemstone according to claim 1, wherein the control signals are lighting control signals, vibration control signals and/or sound control signals;
the alert module comprises a lighting module, a vibration module and/or a sound module;
the lighting module receives the lighting control signals transmitted from the processing module and emits lights according to the received lighting control signals;
the vibration module receives the vibration control signals transmitted from the processing module and vibrates according to the received vibration control signals;
the sound module receives the sound control signals transmitted from the processing module and emits sounds according to the received sound control signals.

3. The smart gemstone according to claim 1, wherein the smart control unit also comprises a positioning module to achieve positioning of a current location, and to transmit the position information to the processing module.

4. The smart gemstone according to claim 1, wherein the base comprises a lower shell and an upper cover; the lower shell and the upper cover are mutually connected to form a sealed cavity; an opening is formed on the upper cover; the gemstone seals the opening.

5. The smart gemstone according to claim 4, wherein the opening on the upper cover is provided with a non-transparent film or a polycarbonate (PC) sheet to prevent the smart control unit and the wireless recharging battery inside the cavity from being seen through the gemstone.

6. A preparation method of a smart gemstone, comprising the following steps:
   Step 1: prepare a base according to the following steps:
   Step A: design the base: use a 3D software to create a 3D model of the base according to dimensions of a smart control unit and a wireless recharging battery;
   Step B: choose materials: choose gemstone raw materials;
   Step C: process the gemstone raw materials: use a cutting machine to cut out a rough blank of the base in a shape and dimension roughly in accordance with design requirements; the rough blank has a dimension larger than an intended exact dimension according to the design requirements to reserve extra materials required to be processed away in the next processing step;
   Step D: shape the base: use a forming machine to obtain a semi-finished product of the base by forming the rough blank in a shape and a dimension substantially equal to the design requirements of the base; the semi-finished product has a dimension larger than the intended exact dimension according to the design requirements to reserve extra material required to be processed away during abrasive processing;
   Step E: pre-heat the semi-finished product and adhere the semi-finished product to an adhesive rod by glue to prepare for abrasive processing;
   Step F: form facets and curved surfaces on the semi-finished product according to the design requirements after rough abrasive processing, moderate abrasive processing and fine abrasive processing of the semi-finished product by using an abrasive disc of a gemstone abrading and polishing machine; thereby obtaining an unpolished final product;
   Step G: apply polishing materials suitable for the materials of the base being chosen on a polishing disc of the gemstone abrading and polishing machine, and polish the unpolished final product to obtain a final product;
   Step H: export a file of the 3D model of the base created by the 3D software, and then import the file to an automatic carving machine to carve the final product to obtain an internally hollowed base;
   Step 2: pack the smart control unit and the wireless recharging battery inside the internally hollowed base obtained in Step 1, and then adhere a gemstone on the base.

7. The preparation method of a smart gemstone according to claim 6, wherein in Step C, use the cutting machine to cut out sheet materials for forming a lower shell and an upper cover in accordance with design requirements, thereby obtaining a lower shell rough blank and an upper cover rough blank; the lower shell rough blank and the upper cover rough blank have larger dimensions compared with the intended exact dimension according to the design requirements to reserve extra materials required to be processed away in the next processing step.

8. The preparation method of a smart gemstone according to claim 7, wherein Step C also comprises using a carving machine to internally hollow out the lower shell rough blank and the upper cover rough blank to form cavities according to setting dimensions, and using also the carving machine to cut out an opening 11 in a middle part of the upper cover rough blank according to setting dimensions.

9. The preparation method of a smart gemstone according to claim 8, wherein the step of packing the smart control unit and the wireless recharging battery comprises:
   packing a wireless module and a sensor module of the smart control unit inside the upper cover to ensure sensitivity of the wireless module and the sensor module; packing a processing module and an alert module of the smart control unit and also the wireless recharging battery inside the lower shell to ensure stability of the processing module, the alert module and the wireless recharging battery; and then applying glue evenly on connecting portions of the lower shell and the upper cover to adhere the lower shell and the upper cover;
   applying glue evenly on connecting portions of the upper cover and the gemstone to adhere the upper cover 1 and the gemstone.

10. The preparation method of a smart gemstone according to claim 6, wherein in Step C, the rough blank has the dimension 1-3 mm larger than the intended exact dimension according to the design requirements;
   in Step D, the semi-finished product has the dimension 0.5-1.0 mm larger than the intended exact dimension according to the design requirements.

\* \* \* \* \*